Avery et al.

[54] TRIAXIAL CABLE TERMINATION AND CONNECTOR SUBASSEMBLY

[75] Inventors: Roger P. Avery, Bethel; Pasquale R. Petti, Waterbury, both of Conn.

[73] Assignee: Bunker Ramo Corporation, Oak Brook, Ill.

[22] Filed: Feb. 20, 1975

[21] Appl. No.: 551,446

Related U.S. Application Data

[63] Continuation of Ser. No. 367,757, June 7, 1973, abandoned.

[52] U.S. Cl. .............................. 174/75 C; 174/78; 174/89; 339/89 C; 339/177 R
[51] Int. Cl.² ................ H01R 21/00; H01R 17/04
[58] Field of Search .............. 174/35 C, 75 R, 75 C, 174/78, 84 C, 88 C, 89; 339/89 C, 177 R, 177 E

[56] References Cited
UNITED STATES PATENTS

| | | | |
|---|---|---|---|
| 2,762,025 | 9/1956 | Melcher | 174/88 C X |
| 2,981,787 | 4/1961 | Brautigam et al. | 174/84 C |
| 3,141,924 | 7/1964 | Forney, Jr. | 174/75 C |
| 3,188,380 | 6/1965 | Lorenz | 174/75 R |
| 3,450,828 | 6/1969 | Joly | 174/75 R |
| 3,539,709 | 11/1970 | Brancaleone | 174/75 C |
| 3,551,882 | 12/1970 | O'Keefe | 174/75 C X |
| 3,613,050 | 10/1971 | Andrews | 174/75 C X |
| 3,701,086 | 10/1972 | Somerset | 339/177 R |

FOREIGN PATENTS OR APPLICATIONS

| | | | |
|---|---|---|---|
| 864,716 | 2/1971 | Canada | 339/177 R |

*Primary Examiner*—Laramie E. Askin
*Attorney, Agent, or Firm*—William Lohff; F. M. Arbuckle

[57] ABSTRACT

This invention relates to a crimp-type connector for terminating triaxial cable. The connector includes a body of a conductive material which body has an extending thin-walled rear ferrule portion. A means, such as a conductive clamp, is provided for clamping the inner braid of the cable in the ferrule portion with a portion of the inner braid in contact with the walls of the ferrule portion. A crimp ferrule is fitted over the outer braid of the cable and a means, such as an insulating bushing, is provided to physically and electrically isolate the inner braid and body from the outer braid and crimp ferrule. The crimp ferrule and ferrule portion of the body are crimped in a single operation to captivate the outer braid and inner braid respectively.

13 Claims, 3 Drawing Figures

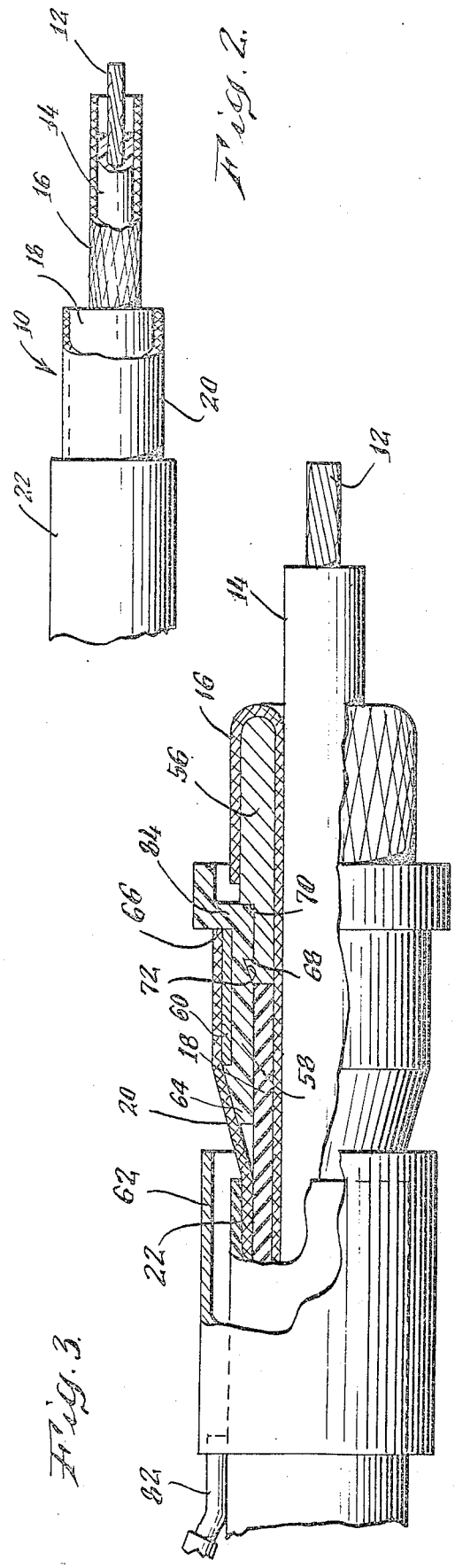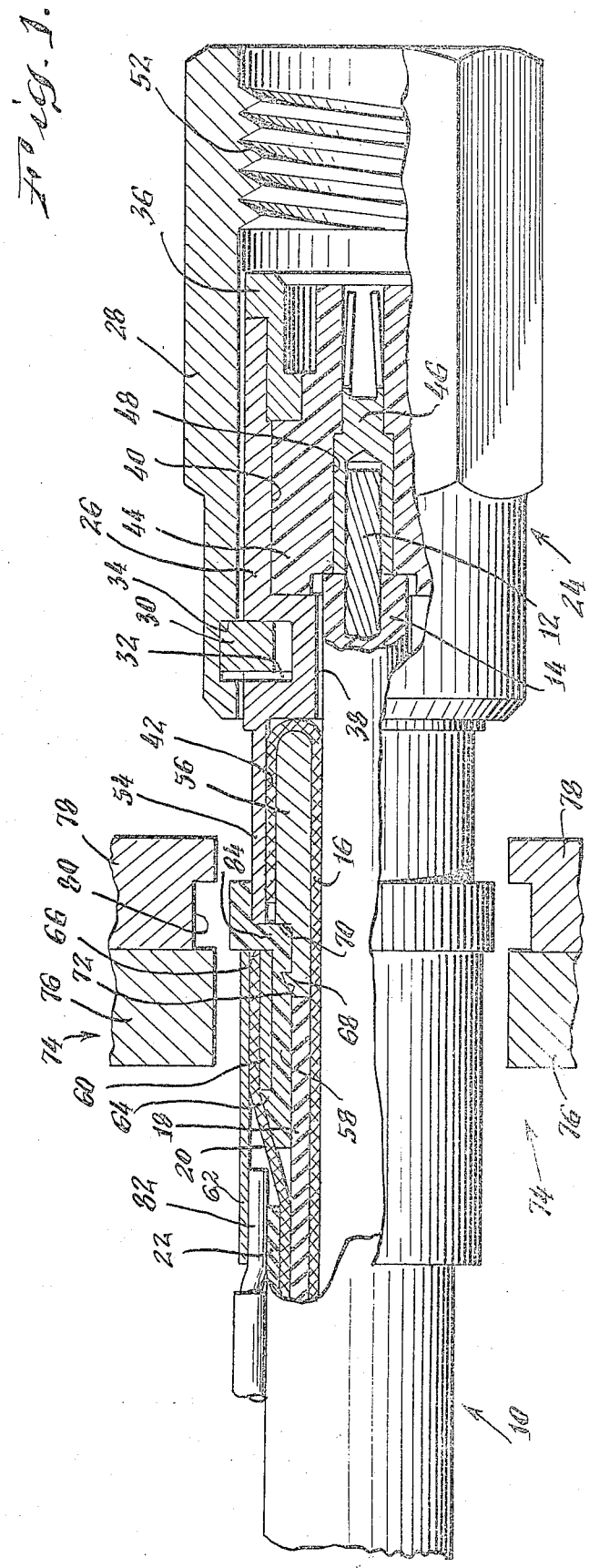

3,982,060

TRIAXIAL CABLE TERMINATION AND CONNECTOR SUBASSEMBLY

The invention herein described was made in the course of or under a contract or subcontract thereunder with the U.S. Government.

This application is a continuation of application Ser. No. 367,757 filed June 7, 1973, now abandoned.

CONNECTOR FOR TERMINATING TRIAXIAL CABLE

This invention relates to a connector for terminating triaxial cable and more particularly to a crimp-type triaxial cable termination adapted for use in applications were miniature connectors are required.

BACKGROUND OF THE INVENTION

A standard coaxial cable has a center conductor surrounded by a dielectric, a conductive braid, and a covering jacket. In triaxial cable, two additional layers are provided, an outer braid covered by an outer jacket. The outer braid serves to shield the cable from electromagnetic interference (EMI) and for this purpose it is preferably grounded. Triaxial cable is thus particularly adapted for use in noisy environments.

In terminating a triaxial cable, it is important that the inner and outer braids be kept isolated from each other and that the outer braid be electrically isolated from the body and outer contacts of the terminating connector. Otherwise, the EMI shielding effect of the outer braid would be negated.

Existing terminations for triaxial cable have clamped the braid in the connector and have been relatively bulky, complicated to fabricate and use, and expensive. The bulkiness of the clamp-type connectors has been a particular problem in attempting to fabricate a miniature triaxial connector and, for this reason, miniature triaxial connectors have not heretofore existed.

A need therefore exists for a relatively simple and relatively inexpensive triaxial connector in which the braids of the cable may be secured by means other than clamping so as to permit the connectors to be minaturized while still providing good isolation between the outer braid and both the inner braid and the connector body.

SUMMARY OF THE INVENTION

In accordance with the above, this invention provides a connector for terminating triaxial cable of the type having a center conductor, an inner braid, a dielectric separating the center conductor and the inner braid, an outer shielding braid, an inner insulating jacket separating the inner and outer braid, and an outer insulating jacket. The connector includes a body of a conductive material which body has an extending thin-walled rear ferrule portion. A means is provided for clamping the inner braid in the ferrule portion with a portion of the inner braid in contact with the ferrule portion. This means may be in the form of a conductive clamp at least the forward portion of which is positioned in the ferrule portion of the body. The inner braid is wrapped around the clamp to fit a portion of the inner braid tightly between the clamp and the ferrule portion. A crimp ferrule is fitted over the outer jacket and an exposed portion of the outer braid and a means, such as insulating bushing, is provided to physically and electrically isolate the inner braid, clamp and body from the outer braid and crimp ferrule. The crimp ferrule and ferrule portion of the body are crimped in a single operation to captivate the outer braid and inner braid respectively.

For a preferred embodiment of the invention, a metallic bushing is positioned between the insulating bushing and the outer braid, the outer braid being firmly held between the metallic bushing and the crimp ferrule when the ferrule is crimped. Means are also provided to secure the metallic bushing, insulating bushing and clamp together to form a subassembly. If desired, a grounding wire may be fitted between the crimp ferrule and the outer braid so as to permit the outer shielding braid to be grounded to a point convenient to the user.

The foregoing and other objects, features and advantages of the invention will be apparent from the following more particular description of a preferred embodiment of the invention as illustrated in the accompanying drawings.

BRIEF DESCRIPTION OF DRAWINGS

FIG. 1 is a half sectional side view of a triaxial connector of a preferred embodiment of the invention along with a portion of a crimp tool suitable for use therewith.

FIG. 2 is a side view of a triaxial cable properly stripped for use with the connector shown in FIG. 1.

FIG. 3 is a half sectional side view of a subassembly of the connector shown in FIG. 1, the subassembly being shown prior to placement in the connector body.

DETAILED DESCRIPTION

Referring now to FIG. 2, it is seen that the triaxial cable 10 has a center conductor 12, a dielectric 14 of insulating material, an inner conductive braid 16, an inner jacket of insulating material 18, an outer conductive braid 20, and an outer insulating jacket 22. Dielectric 14 is cut back to expose a portion of center conductor 12 with inner braid 16 extending beyond dielectric 14 but not quite to the end of center conductor 12. Inner jacket 18 and outer braid 20 are cut back by the same amount with outer jacket 22 being cut back to expose a portion of outer braid 20.

Referring now to FIG. 1, it is seen that the triaxial connector 24 is formed of a conductive body 26 having a conductive coupling nut 28 mounted for rotation thereon by a retaining ring 30 fitted partially in a groove 32 formed in the body and partially in a groove 34 formed in the coupling nut. Body 26 has an outer contact 36 of a conductive material such as a copperbase alloy secured in its forward end and has a bore 38 with enlarged forward and rear counterbores 40 and 42 respectively. A dielectric 44 of an insulating material such as polytetrafluoroethylene is fitted in forward counterbore 40. A center contact 46 is positioned in a center bore 48 formed in dielectric 44. Center conductor 12 of cable 10 fits in an opening in the rear of contact 46 and is held therein by soldering. Coupling nut 28 is threaded at 52 and is utilized for coupling connector 24 to a mating connector element. The elements described so far are of fairly conventional design and do not form part of the present invention.

The walls 54 around counterbore 42 are relatively thin and form an extending ferrule portion of the body 26. The remaining elements of the connector are a braid clamp 56 of a conductive material such as brass, an insulating bushing 58 of an insulating material such as polyarylsulfone, a metallic bushing 60 or conductive sleeve of a metallic material such as brass, and a crimp ferrule 62 of a conductive material such as brass. Bushing 60 is mounted on bushing 58 by pushing the bushing 60 over a tapered end or barb 64, bushing 60 being held between barb 64 and a shoulder 66 of bushing 58. Clamp 56 has a barb 68 on a thinned rear section thereof, the rear section terminating in a shoulder 70. Barb 68 is pushed into a mating recess 72 in bushing 58 with a forward wall of the bushing bearing against shoulder 70. Clamp 56 and bushings 58 and 60 may thus be fitted together to form a subassembly.

In assembling the connector 24, cable 10 is first stripped as shown in FIG. 2 and crimp ferrule 62 is then slipped over the outer jacket 22 of the cable. The subassembly consisting of clamp 56 and bushings 58 and 60 is then placed onto the cable so that the back end of braid clamp 56 butts against the cut end of cable inner jacket 18 and insulating bushing 58 with the tapered end 64 and metallic crimp bushing 60 slide between the outer braid 20 and inner jacket 18. Inner braid 16 which now extends beyond clamp 56 is combed and folded or wrapped around the front and top of the clamp as shown in FIGS. 1 and 3. FIG. 3 shows the connector at this stage in the assembly operation. The assembly, with the cable mounted thereon as indicated, is then inserted into counterbore 42 of connector body 26 until the portion of inner braid 16 wrapped around the tip of clamp 56 butts against the rear wall of the counterbore. Crimp ferrule 62 is then brought up over the cable outer braid 20 until it butts against insulating bushing 58.

The final step in the operation is the crimping of ferrule 62 and the ferrule portion 54 of body 26 with a specially designed crimp tool 74. The tool consists typically of two hex crimp dies 76 and 78, with the die 78 having a recess 80 formed therein. The connector is positioned in tool 74 with die 76 over ferrule 62, the leading edge of the die butting against the wall 66 of bushing 58, die 78 over ferrule portion 54, and the portion of bushing 58 on the outside of the connector fitted in recess 80. With tool 74, both the crimping of portion 54 to captivate inner braid 16 and the crimping of ferrule 62 to captivate outer braid 20 may be performed in a single crimping operation. During the crimping operation, bushing 60 provides a hard surface against which outer braid 20 may be pressed to assure captivation. However, if insulating bushing 58 is sufficiently hard, or if its upper surface is sufficiently ridged or otherwise roughened to assure captivation, bushing 60 may be eliminated.

It will be noted from the foregoing description and drawings that the outer peripheral surface of bushing 58 has a constant diameter portion less than the diameter of the expanded portion of the outer braid 20 to enable the expanded outer braid to be received thereover for subsequent deformation or displacement in response to radial pressure. An outer peripheral surface portion of the bushing tapering radially inwardly toward one end of the bushing enables facile insertion of the bushing between the braid and jacket. The inner peripheral surface of the bushing has a diameter larger than the diameter of the outer peripheral surface of the jacket 18 so that it moves axially over the jacket.

The clamp member 56 has an inner peripheral surface whose diameter is larger than the inner braid and smaller than the diameter of the outer peripheral surface of the jacket 18 so that passage over the jacket is prevented and a portion of one end of the member 56 abuts one end of the jacket 18 in response to simultaneous axial movement of the clamp member over the inner braid and bushing over the jacket, respectively, with the tapered end of the bushing spaced from the portion of the clamp member 56 to enable insertion of the tapered end between the outer braid and jacket. The abutting relationship between the clamp member and jacket, of course, resists relative movement in one direction between the jacket and clamp member.

The outer diameter of the member 56 is less than the diameter of the inner surface of the connector body or rear annular ferrule portion 26 and the outer diameter of the clamp member controls the radial position of the expanded folded back portion of the inner braid for facile passage into the connector rear ferrule portion and for subsequent deformation or displacement in response to radial pressure against the ferrule.

By folding back a portion of the inner braid over clamp member 56, relative movement of the clamp member toward the ferrule is, of course, resisted. In addition, it will be noted that the clamp member and bushing each have a wall thickness and a formed of a material which is impervious to or avoids deformation in response to radial pressure on the connector ferrule portion and outer braid of sufficient magnitude to deform or displace the ferrule portion and the inner and outer braids to secure the same since deformation of the clamp member or bushing in response to this pressure could render the cable or its attachment useless.

If required, a grounding wire 82 may be inserted with the outer braid between ferrule 62 and crimp bushing 60 before the crimping operation is performed so that the outer braid may be grounded to a housing or other point convenient to the user.

From the above it is seen that a triaxial connector has been provided which, by means of insulating bushing 58, completely isolates, both physically and electrically, the inner braid 16 and connector body 26 from the outer braid 20 and other elements electrically connected thereto. In particular, bushing 58 has a radial portion 84 which projects between body 26 and clamp 56 on one side and bushing 60 and ferrule 62 on the other side, thus isolating the inner and outer braid captivating elements. Any propagating of EMI to the inner coaxial line of the triaxial cable and through the connector is thus thoroughly prevented. Further, the connector has a minimum of parts which are relatively easily assembled with both the inner and outer braid being anchored by a single crimp operation. The connector, being of the crimp type, and having a small number of parts, may thus be easily miniaturized. An optional grounding wire is also easily affixed in the connector.

While the invention has been particularly shown and described above with reference to a preferred embodiment thereof, it will be apparent to one skilled in the art that various changes in form and detail may be made therein without departing from the spirit and scope of the invention.

What is claimed is:
1. A combination comprising:
a triaxial cable having a center conductor, an inner conductive braid encircling said center conductor, a dielectric separating said center conductor and said inner braid, an outer conductive shielding braid encircling said inner braid, an inner insulating jacket separating said inner braid from said outer braid and stripped with said outer braid from one end of said inner braid to provide a stripped portion of inner braid, an outer insulating jacket encircling said outer shielding braid with said outer insulating jacket stripped from one end of said outer shielding braid to provide an exposed portion of said outer shielding braid;

a body of a conductive material, said body having an axially extending thin-walled rear ferrule portion overlapping the stripped portion of said inner braid;

a conductive clamp, at least a forward portion of said clamp being positioned in said rear ferrule portion with said clamp overlappingly engaged with the stripped portion of said inner braid and having the stripped portion of said inner braid wrapped around said forward portion to fit the stripped portion of said inner braid tightly between said clamp and said rear ferrule portion;

a crimp ferrule fitted over said outer jacket and the exposed portion of said outer braid;

an insulating bushing fitted between said inner jacket and said outer braid, said bushing being shaped and positioned to physically and electrically isolate said inner braid, clamp and body from said outer braid and crimp ferrule;

a metallic bushing positioned between said insulating bushing and said outer braid;

a first crimp formed in said crimp ferrule to secure said outer braid between said metallic bushing and said crimp ferrule; and a second crimp formed in said rear ferrule portion and spaced axially from said first crimp to secure said rear ferrule portion to said conductive clamp and inner braid.

2. A combination as claimed in claim 1, including a barb and a shoulder formed on said insulating bushing, said metallic bushing being retained on said insulating bushing between said barb and said shoulder.

3. A combination as claimed in claim 2, wherein said clamp includes a barb and a shoulder and said insulating bushing includes a recess and a forward wall, said clamp and said insulating bushing being fitted together with said barb of said clamps in said recess and said wall abutting against said shoulder to form said insulating bushing and clamp into a subassembly.

4. A subassembly adapted to secure a connector rear annular ferrule portion to a triaxial cable including a radially expandible outer annular conductive braid and a coaxial annular inner conductive braid separated from said outer braid by an inner insulating coaxial annular jacket located between said inner braid and said outer braid with one end of said inner braid extending axially beyond one end of said jacket and outer braid and expandible to form a folded back portion spaced radially outwardly of said inner braid one end with said folded back portion having a diameter less than the diameter of the inner periphery of said annular ferrule portion for passage with said inner braid one end into said annular ferrule portion, said subassembly comprising:

an axially extending insulating annular bushing having a tapered outer peripheral surface portion adjacent one end of said bushing tapering radially inwardly toward said bushing one end, said bushing having an outer peripheral surface portion of constant diameter less than the diameter of the expanded outer braid and an inner peripheral surface with a diameter larger than the diameter of the outer peripheral surface of said inner jacket to overlappingly engage said insulating bushing over said inner jacket in response to the axial movement of said bushing over said jacket;

a conductive annular clamp member having an inner peripheral surface of a diameter larger than the one end of said inner braid and less than the outer diameter of the peripheral surface of said inner jacket to prevent passage of said clamp member over said one end of said inner jacket in response to the movement of said clamp member axially over said inner braid, said clamp member having an outer peripheral surface of a diameter less than the diameter of the inner peripheral surface of said connector annular ferrule portion and controlling the radial position of said folded back portion of the inner braid in said ferrule portion in response to the folding back of said expanded inner braid over the outer peripheral surface of said clamp member and passage of said connector ferrule portion axially over said clamp member and folded back portion to thereafter enable deformation of said inner folded back portion against said clamp member in response to radial pressure against said annular ferrule portion; and means on said clamp member and on said bushing securing said conductive clamp member coaxially to said insulating bushing with said bushing and clamp member extending axially away from each other and said tapered outer surface portion adjacent said bushing one end spaced from said clamp member to enable the installation of said bushing one end and surface of constant diameter between said inner jacket and expanded outer braid in response to the simultaneous axial movement of said bushing and clamp member over said inner jacket and inner braid, respectively, to thereafter enable deformation of said outer braid against said bushing in response to radial pressure against said expanded outer braid;

said clamp member and said bushing each having a wall thickness and formed of a respective material avoiding deformation in response to radial pressure of sufficient magnitude against said ferrule portion and expanded outer braid, respectively, to deform said ferrule portion and said inner and outer braids.

5. In a subassembly as claimed in claim 4, a metallic bushing; and means securing said metallic bushing in overlapping engagement with said insulating bushing for receipt between said outer braid and said insulating bushing.

6. The subassembly as claimed in claim 4, in which said means securing said conductive clamp member to said insulating bushing includes a reduced portion on said clamp member overlapped by said bushing and complementary radially extending nestingly engaged formations on said reduced portion and said insulating bushing, respectively.

7. The subassembly as claimed in claim 4, in which said insulating bushing includes a radially outwardly extending shoulder for engaging one axial end of said connector ferrule portion, and an axially extending lip for overlapping engagement with the periphery of said connector ferrule portion; and said conductive clamp member includes a shoulder engaging said shoulder on said insulating bushing.

8. An assembly for securing a connector rear conductive ferrule portion to a triaxial cable having an insulating jacket, a radially flexible outer conductive braid about the insulating jacket, and an inner flexible conductive braid within and extending beyond one end of the insulating jacket to form a folded back end portion, said assembly comprising:
- a conductive braid clamp including a first portion for interposition between and contacting the inner conductive braid and the folded back end portion thereof and to urge the folded back end portion in contact with the inner surface of the ferrule portion, and including a second portion;
- an insulating bushing including a first portion having an inner surface for contacting the outer surface of the ferrule portion, a second portion overlying said second portion of said braid clamp, and a third portion extending rearwardly of said second portion for contact with the outer surface of the insulating jacket;
- said second portion of said braid clamp and said second portion of said insulating bushing including respective complementary holding means for mounting said bushing on said braid clamp; and
- a conductive bushing mounted on said third portion of said insulating bushing, said third portion including means defining a recess below the outer surface thereof receiving said conductive bushing, and a tapered end to guide the outer conductive braid radially outwardly and axially to overlie and contact said conductive bushing,
- said insulating bushing including a radially extending fourth portion intermediate said first and second portions for isolating said conductive bushing and the outer braid from the ferrule portion.

9. An assembly for securing a connector rear annular conductive ferrule portion to a triaxial cable having an insulating jacket, a radially flexible outer conductive braid about the insulating jacket, and an inner flexible conductive braid within and extending beyond one end of the insulating jacket to form a folded back end portion, said assembly comprising:
- an annular conductive braid clamp including a first portion for interposition between and contacting the inner conductive braid and folded back end portion thereof and to urge the folded back portion in contact with the inner surface of the ferrule portion, said annular conductive braid clamp further including a second portion;
- an annular insulating bushing including a first portion having an inner surface for contacting the outer surface of the ferrule portion, a second portion overlying said second portion of said braid clamp, and a third portion extending rearwardly of said second portion for contact with the outer surface of the insulating jacket,
- said second portion of said braid clamp and said second portion of said insulating bushing including respective complementary holding means for mounting said bushing on said braid clamp; and
- an annular conductive bushing mounted on said third portion of said insulating bushing, said third portion including means defining a recess below the outer surface thereof receiving said conductive bushing, and a tapered end to guide the outer conductive braid radially outwardly and axially to overlie and contact said conductive bushing,
- said insulating bushing including a radially extending fourth portion intermediate said first and second portions for isolating said conductive bushing and the outer braid from the ferrule portion.

10. The assembly set forth in claim 9, wherein said holding means comprises:
- a recess in the inner surface of said insulating bushing; and
- a projection on the outer surface of said braid clamp shaped complementary to said recess in the inner surface of said insulating bushing.

11. The assembly of claim 10, wherein said projection includes a barb having an inwardly directed taper in the direction of the triaxial cable end of the assembly and a shoulder extending transversely of the longitudinal axis of the assembly at the end of the barb on the connector side of the assembly, said recess having complementary shaped surfaces to mate with said taper and said shoulder of said barb.

12. The assembly set forth in claim 9, wherein said first, second and third portions of said insulating bushing extend longitudinally of said assembly, with said first portion having a greater diameter than said second and third portions, and wherein said fourth portion extends transversely of the assembly and connects said first and second portions.

13. A connector for terminating a triaxial cable which has an inner conductive braid and an outer conductive braid separated by an insulating jacket, said connector comprising: a body of conductive material, said body including a rearwardly extending thin-walled ferrule portion; a clamp of conductive material, a forward portion of said clamp adapted to be disposed within said ferrule portion with the inner braid folded back about said clamp and adapted to be urged by said clamp in tight engagement with said ferrule portion; a crimp ferrule of a conductive material for embracing the outer braid; and a bushing of an insulating material including a plurality of bushing portions for respectively physically and electrically isolating said body, said clamp and the inner braid from said crimp ferrule and the outer braid, said bushing and said clamp including interengaging portions which prevent movement thereof axially of said connector, and said crimp ferrule and said ferrule portion each including crimpable portions for captivating the inner and outer braids.

* * * * *